(12) United States Patent
O'Donnell, Sr.

(10) Patent No.: US 6,515,177 B1
(45) Date of Patent: Feb. 4, 2003

(54) METHOD OF COATING MATERIALS AND MATERIALS FORMED THEREBY

(75) Inventor: James M. O'Donnell, Sr., North Smithfield, RI (US)

(73) Assignee: The Homestead Corporation, Slatersville, RI (US)

( * ) Notice: Subject to any disclaimer, the term of this patent is extended or adjusted under 35 U.S.C. 154(b) by 28 days.

(21) Appl. No.: 09/896,694

(22) Filed: Jul. 2, 2001

Related U.S. Application Data

(62) Division of application No. 09/715,303, filed on Nov. 17, 2000, now Pat. No. 6,432,156.
(60) Provisional application No. 60/166,006, filed on Nov. 17, 1999.

(51) Int. Cl.[7] .................. C05C 9/02; C07C 273/18; C07C 269/04
(52) U.S. Cl. ................ 564/61; 71/28; 71/29; 71/30; 71/33; 71/34; 71/63; 71/64.11; 560/157; 560/158; 564/35; 564/38; 564/60
(58) Field of Search ................ 560/157, 158; 564/35, 38, 60, 61; 71/28, 29, 30, 33, 34, 63, 64.11

(56) References Cited

U.S. PATENT DOCUMENTS

| | | | |
|---|---|---|---|
| 2,652,377 A | 9/1953 | Kise | 260/29.4 |
| 2,882,141 A | 4/1959 | O'Donnell | 71/30 |
| 3,666,523 A | 5/1972 | Nau | 117/33 |
| 4,554,004 A | 11/1985 | Bierman et al. | 71/29 |
| 5,039,328 A | 8/1991 | Saitoh et al. | 71/28 |
| 5,102,440 A | 4/1992 | Gallant et al. | 71/28 |
| 5,238,480 A | 8/1993 | Rehberg et al. | 71/28 |
| 5,431,708 A | 7/1995 | Lehmann et al. | 71/28 |
| 5,501,720 A | 3/1996 | Buchholz | 71/28 |
| 5,849,060 A | 12/1998 | Diping et al. | 71/30 |
| 5,851,261 A | 12/1998 | Markusch et al. | 71/64.07 |
| 5,938,813 A | 8/1999 | Araya et al. | 71/64.07 |

OTHER PUBLICATIONS

Association of American Plant Food Control Officials,",", Official Publication No. 47. (1993).

Kadowaki II, "New Compounds of Urea–Formaldehyde Condensation Products," vol. II (No. 3.), (Mar. 28, 1936).

*Primary Examiner*—Peter O'Sullivan
(74) *Attorney, Agent, or Firm*—Salter & Michaelson

(57) ABSTRACT

A method of forming a methylol urea prepolymer and a particle coated in with the prepolymer. The method involves providing a source of methylol urea and a source of aldehyde and reacting the urea and the aldehyde in the presence of an excess of urea to form the methylol urea prepolymer. The coated particle is preferably a controlled-release fertilizer particle. The particle is a substrate coated with a substantially uniform coating comprising a total nitrogen content ranging from about 39N to about 42N. The coating includes a low molecular weight methylene urea compounds.

10 Claims, 13 Drawing Sheets

METHOD OF COATING MATERIALS AND MATERIALS FORMED THEREBY

RELATED CASES

This application is a division of U.S. Patent application Ser. No. 09/715,303, filed Nov. 17, 2000, now U.S. Pat. No. 6,432,156, which claims priority under 35 U.S.C. §119(e) to U.S. Provisional Patent Application No. 60/166,006 to O'Donnell which was filed on November 17, 1999.

BACKGROUND OF THE INVENTION

1. Field of the Invention

The present invention is directed to a method of coating materials and the materials coated thereby and, in particular, to a method of coating fertilizers and the fertilizers coated thereby.

2. Related Art

Two types of commercially available fertilizers include water soluble fertilizers and "controlled release" or "slow release" fertilizers. Water soluble fertilizers are generally less expensive than controlled release fertilizers, but have the disadvantage of leaching nutrients very quickly into and through the soil. As result, frequent re-application of the fertilizer is required in order to supply the desired amount of nutrients to plants or soil. In addition, the leachate is sometimes cause for concern in areas that rely on wells or aquifers for their water supply.

Controlled release fertilizers are designed to release nutrients to plants or soil over an extended period of time, which is more efficient than multiple applications of water soluble fertilizers. Therefore, controlled release fertilizers minimize the frequency with which plants must be fertilized, as well as reduce or minimize leachate. However, controlled release fertilizers are generally more costly than water soluble fertilizers.

Some controlled release fertilizers are formed by coating fertilizer nutrients with inert plastic materials. Such inert materials have little or no agronomic value, and tend to reduce the plant food content of the fertilizer, in some instances by as much as 50 percent. The mechanism of release of the fertilizer nutrients through the coating is by osmosis. The osmosis process varies widely, depending on, in part, the amount of moisture available and the soil temperature factor.

Attempts have been made to increase the amount of nutrients in fertilizer coatings by reacting urea and formaldehyde in the presence of an added component or components. U.S. Pat. No. 2,882,141 discloses one example of this in which chelating agents such as ethylenediaminetetracetic acid (EDTA) was added to a liquid urea and formaldehyde prepolymer (U/F prepolymer), which is subsequently polymerized. However, upon acidulation the prepolymer results in a product that includes a substantial amount of intermediate and higher molecular weight polymers, including trimethylenetetraurea and tetramethylenepentaurea. Generally, such intermediate and higher molecular weight polymers have an amorphous powdery structure, which is disadvantageous when used to coat particles, as the nutrients are easily leached through the amorphous coating.

Generally, methods that employ significant amounts of free formaldehyde in the prepolymer tend to form hexamethylenetetramine and the corresponding acid when the prepolymer is added to an ammonium salt. For example, U.S. Pat. No. 5,102,440, issued on Apr. 7, 1992 to Gallant et al., discloses a urea-formaldehyde mixture having a urea formaldehyde molar ratio ranging from 2.4 to 13.3. This greatly restricts the use of these prepolymers in fertilizer mixtures that contain, for example, ammonium sulfate (AS) and ammonium phosphates (AP), which are advantageous in high pH soils.

Any improvement in controlled release fertilizers is desirable.

SUMMARY

The present invention is directed to, in one embodiment, a method of forming a methylol urea prepolymer. The method involves providing a source of methylol urea and a source of aldehyde and reacting the urea and the aldehyde in the presence of an excess of urea to form the methylol urea prepolymer. Preferably, the urea and aldehyde are provided in a mole ratio of at least about 1.5 mole of urea to about 1 mole of formaldehyde. The urea and the aldehyde are preferably reacted in a pH range of about 7.0 to about 10.0, and at a temperature of at least about 40° C. The method may also be used to form a methylene urea reaction product by acidifying the methylene urea prepolymer in a pH range of about 3.0 to about 4.0. The methylene urea reaction product includes relatively low molecular weight methylene urea compounds.

In another embodiment, the invention is directed to a controlled-release fertilizer particle. The particle includes a substrate coated with a substantially uniform coating including relatively low molecular weight methylene urea compounds. The coating includes a total nitrogen content ranging from about 39 N to about 42 N. The coating includes less than about 50 percent, by weight, of the total particle weight.

In another embodiment, the invention is directed to a controlled-release fertilizer particle that includes a substrate coated with a substantially uniform coating comprising a total nitrogen content ranging from about 39N to about 42N. The coatin g includes low molecular weight methylene urea compounds. The substrate is preferably any fertilizer particle, including an ammonium sulfate particle and an ammonium phosphate particle.

In another embodiment, the invention is directed to a particle of a methylene urea composition having a total nitrogen content ranging from about 40N to about 42N.

In another embodiment, the invention is directed to a method of forming a methylene urea having a total nitrogen content ranging from about 40N to about 42N. The method involves providing a source of methylol urea and a source of aldehyde and reacting the urea and the aldehyde in the presence of an excess of urea to form the methylol urea prepolymer, and acidifying the methylene urea prepolymer in a pH range of about 3.0 to about 4.0 to form a methylene urea reaction product.

Other objects, features and advantages of the invention shall become apparent as the description thereof proceeds when considered in connection with the accompanying illustrative drawings.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which.

DETAILED DESCRIPTION OF THE PREFERRED EMBODIMENTS

Figure 1:
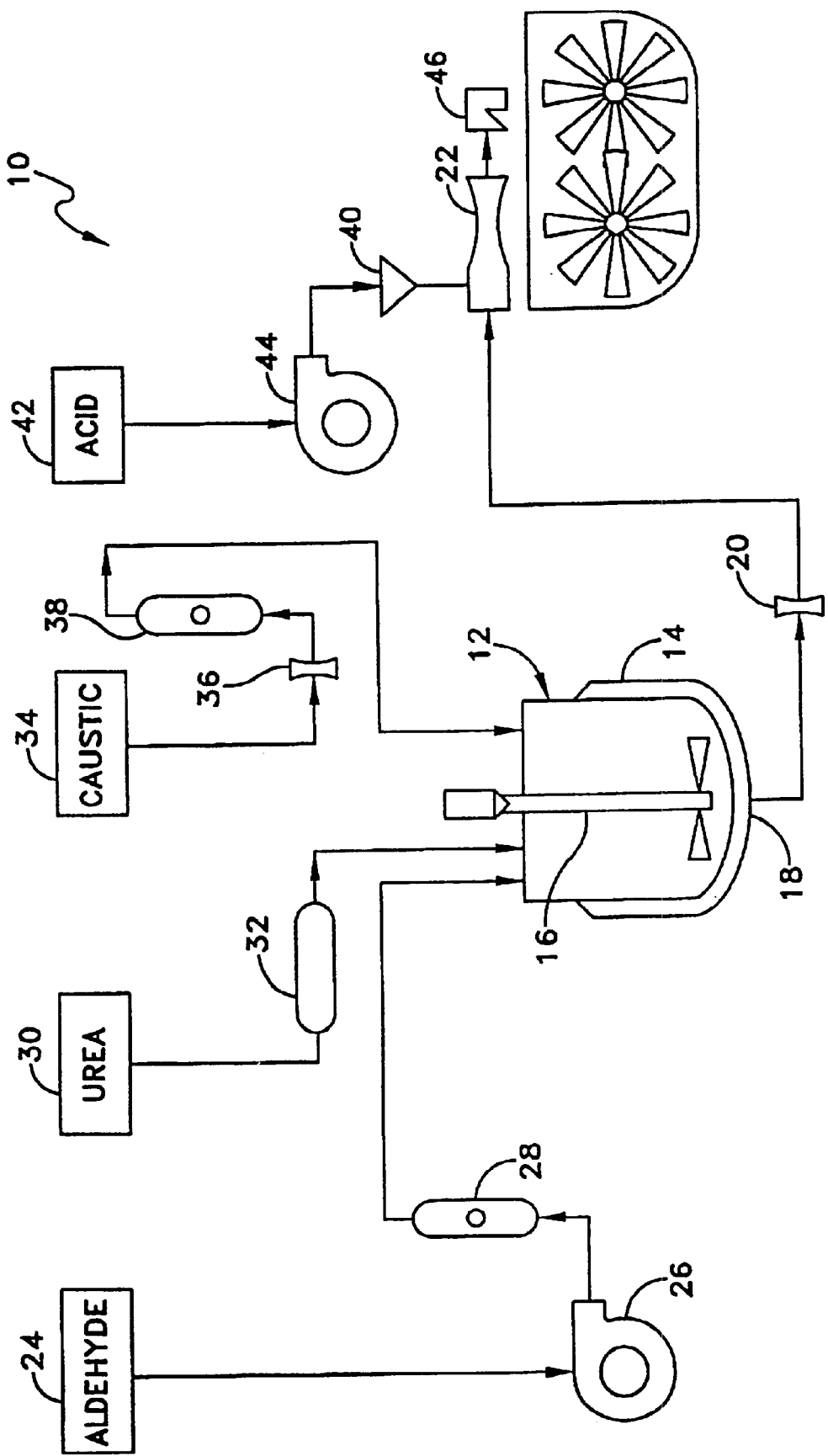
FIG. 1 is a schematic illustration of an apparatus used to form the compositions of the present invention.

The present invention is directed to a relatively low molecular weight methylene urea coating composition, a method of coating particles with the composition, and to the coated particles formed thereby. The coatings preferably include plant nutrients, thereby increasing the total concentration of nutrients in the coated particles. The coating breaks down biologically in the soil over a prolonged period of time, allowing the controlled or slow release of plant nutrients from the particles and the coating.

One embodiment of the present invention is directed to a method for forming a relatively low molecular weight methylene urea coating composition. The method involves forming a solution of urea and formaldehyde in which the solution contains an excess of urea. Preferably, the excess of urea is provided in the solution by maintaining a mole ratio of about 1.5 to about 4.0 moles of urea to about 1.0 mole of formaldehyde. The presence of free urea in the solution is essential to the later formation of the desired low molecular weight methylene urea di-mers and tri-mers. The pH of the solution is preferably adjusted to and maintained at a pH of between about 7.0 to about 10.0 and heated to a temperature of about 40° C. to about 180° C. At a pH lower than about 7.0, the urea and methylol may begin to polymerize prematurely, leading to undesirable higher molecular weight methylene ureas. At a pH greater than about 10, the methylol urea with begin to trimerize; the trimers are water insoluble. However, the trimerization reaction may be reversed by reducing the pH of the solution, whereas premature polymerization cannot be reversed.

The heated solution is allowed to react until complete methylolization has occurred, which is indicated by the absence of free formaldehyde. Completion of the methylolization typically takes from about 5 minutes to about 60 minutes, depending on the conditions under which the reaction takes place.

The resulting methylol urea prepolymers are then acidified to effect polymerization and formation of the desired low molecular weight methylene ureas. Preferably, a dilute acid is combined with the methylol urea prepolymers, and the resulting mixture is preferably maintained in a range of about 2.5 to about 5.0, more preferably in a range of about 3.0 to about 4.0. A lower pH may tend to overreact the material, causing the formation of the undesirable higher molecular weight methylene ureas. A higher pH may tend toward a sluggish reaction, reduce the amount of methylene ureas while increasing the amount of free urea in the fial product, create larger particles than desired, and increase the residency time. The acidification reaction proceeds according to the following general reaction:

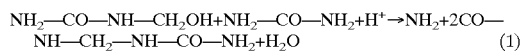

$$NH_2-CO-NH-CH_2OH+NH_2-CO-NH_2+H^+ \rightarrow NH_2+2CO-NH-CH_2-NH-CO-NH_2+H_2O \qquad (1)$$

monomethylolurea  urea  methylene diurea

Unlike other prepolymers, methylol urea prepolymers are self-neutralizing after acidification and conversion to methylene ureas. The resulting methylene ureas have relatively high percentages of low molecular weight methylene ureas such as methylenediurea and dimethylenetriurea which, as previously described, have excellent film forming properties useful for providing a uniform coating on particulate substrates.

Preferably, at least 20 percent of the total nitrogen in the final product comes from methylenediurea, dimethylenetriurea, or a combination of methylenediurea and dimethylenetriurea. Preferably, the final product includes about 40 percent to about 60 percent, by weight, of methylenediurea, dimethylenetriurea, or a combination of methylenediurea and dimethylenetriurea.

Because prepolymers formed from methylol urea compounds will not adversely react with substrates such as ammonium sulfate and ammonium phosphate, the methylol ureas have particular utility when used to form a coating for fertilizer particles that have been otherwise difficult to coat, such as ammonium phosphate and ammonium sulfates. Thus, in the present invention, methylol ureas are used as the primary source of aldehydes. Any source of commercially available prilled or granular urea containing at least about 45 nitrogen, by weight, is suitable for the process.

Suitable aldehyde sources include those having at least about 30 percent formaldehyde, more preferably at least about 50 percent. Lower concentrations of formaldehyde result in end products having significantly higher moisture content, resulting in higher drying costs. One suitable commercially available source includes about 37 percent formaldehyde. Another suitable source of aldehyde is U.F. concentrate-85, which is a resin solution containing about 60 percent formaldehyde, about 25 percent urea, and about 15 percent water. This product is more fully described in U.S. Pat. No. 2,652,377 issued Sep. 15, 1953. When using this form of formaldehyde care should be taken to dilute the resin in order to end up with about a 50 percent formaldehyde equivalent. Failure to do this may result in a solution containing undissolved urea which will adversely affect the reaction at the methyleneization step. Thus, a proper dilution for U/F concentrate-85 may be about 65 percent U/F concentrate-85 and about 35 percent water.

A suitable apparatus 10 for forming the present methylol urea prepolymers is illustrated schematically in FIG. 1. Apparatus 10 includes a reaction vessel 12 that includes a heating/cooling jacket 14, a mixer 16, and a release valve 18 disposed at the bottom. Reaction vessel 12 is fluidly connected to a diaphragm metering pump 20 and an ejector 22 via release valve 18.

During the start-up phase of operation, release valve 18 is closed and diaphragm metering pump 20 is inactive. Then, aldehyde from a source of aldehyde 24 is transferred to reaction vessel 12 by a pump 26, which is regulated by a float meter 28. Similarly, urea from a source of urea 30 is metered through a gravimetric feed belt 32 to reaction vessel 12. The urea and aldehyde are combined in reaction vessel 12. Caustic from a source of caustic 34 (typically potassium hydroxide ca. 50 percent solution) is metered through a pump 36 and float meter 38 to adjust and maintain the pH of the urea and aldehyde solution in a range of about 7.5 to about 9.0. In the preferred practice of the invention, the urea and aldehyde are reacted in reaction vessel 12 for a period of time sufficient to complete the methylolization reaction which is indicated by the absence of free urea. The temperature in reactor 12 is controlled by heating and cooling jacket 14.

When the methylolization is complete, release valve 18 is opened, metering diaphragm pump 20 is activated, and the methylol urea prepolymers are dispensed to ejector 22. As the methylol urea prepolymers pass through ejector 22, a vacuum is created at funnel point 40. A suitable dilute acid is metered from a source of acid 42 by pump 42 to vacuum funnel point 40. At this point the acid and the methylol urea prepolymers are intimately mixed, followed by being discharged from ejector 40 and distributing nozzle 46. Preferably, the material discharged through ejector 40 and distributing nozzle 46 is maintained in a range of about 3.0 to about 4.0, because a lower pH may tend to overreact the material, causing the formation of higher molecular weight methylene ureas than are desirable for the process, whereas a higher pH may tend towards a sluggish reaction and subsequent fouling of the apparatus.

Preferably, all the material input streams are continuously metered to the reaction vessel 12 at the same rate that their combined flow will be exiting through the ejector 22 and distributing nozzle 46.

Figure 2:
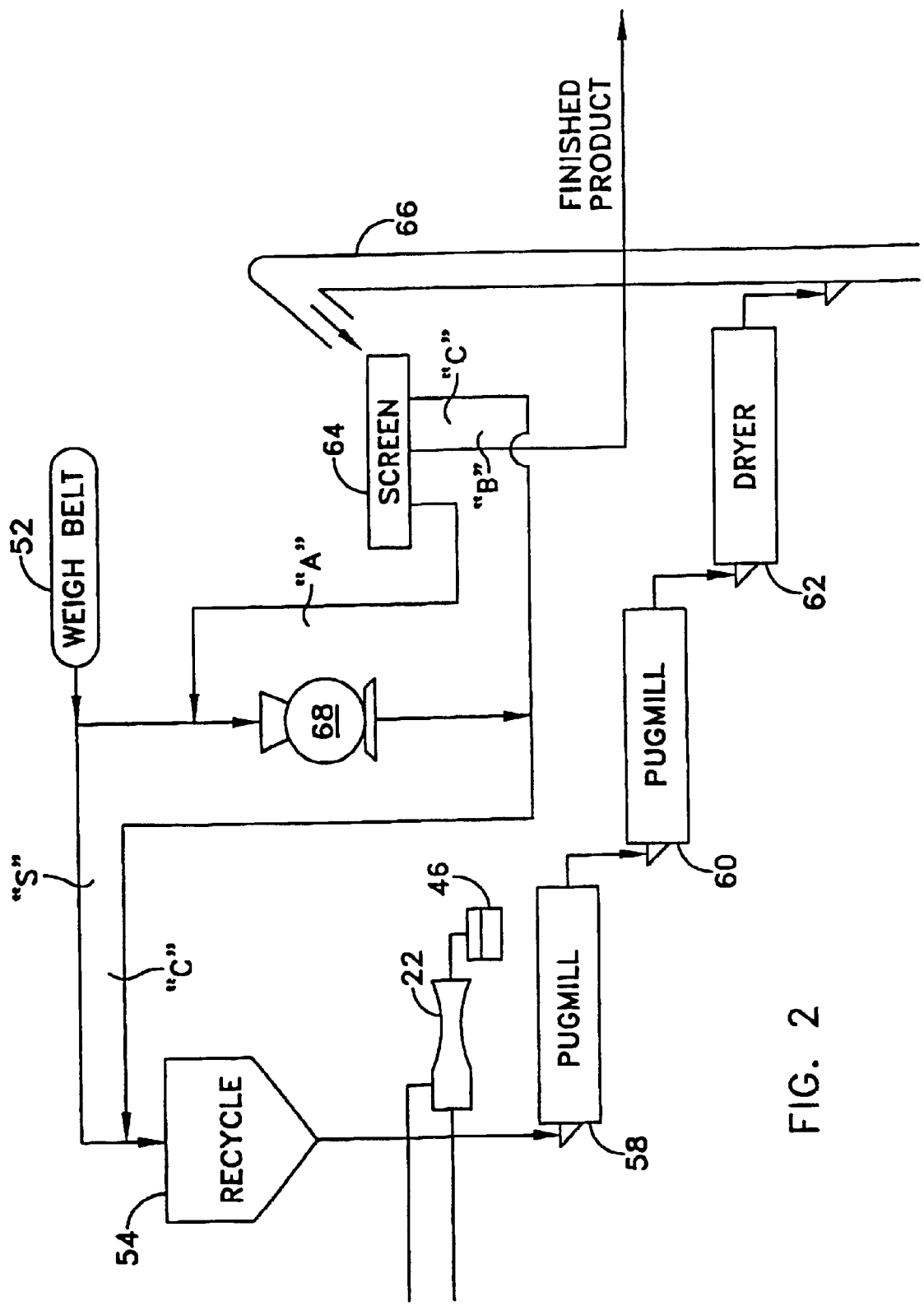
FIG. 2 is a schematic illustration of the film coating process according to the present invention.

The method of coating particles is illustrated schematically with reference to apparatus 50 in FIG. 2. Although shown separately, those of ordinary skill in the art will recognize that apparatus 10 and apparatus 50 may be operated sequentially and continuously, if desired.

As shown in FIGS. 1 and 2, the methylol urea prepolymers are metered through ejector 22 along with sufficient dilute acid to reduce the pH to between about 3.0 and about 4.0 at distributing nozzle 46. The resulting materials are relatively low molecular weight methylene urea compounds useful for coating material. At this point, an exothermic reaction is initiated, which converts the methylol urea prepolymer compounds to film forming methylene urea compounds according to reaction formula (1) above. Concurrently, substrates to be coated "S" are fed through a weigh belt 52 to a recycle bin 54, which contains a recycle material, as described in greater detail below. In a continuous process, the recycle material will be at an elevated temperature after being passed through the dryer. Typically, the temperature of the recycle material will be in the range of about 140° F. to about 200° F. If necessary, the substrates to be coated may be passed through a grinder 56 to reduce their size prior to their introduction to recycle bin 54. Sufficient recycle material is transferred to a first pug mill 58 from recycle bin 54 to effect proper coating of the material from the recycle bin.

Reactions (1) and (2) proceed to completion in a second pug mill 60, at which point the methylene urea compounds are transferred to a dryer 62. After drying, the methylene urea compounds are transferred to a Rotex screener 64 by a bucket elevator 66. Rotex screener 64 preferably divides the methylene urea compound into three categories: (A) oversized material; (B) finished product of the desired size; and (C) fines. The oversized material A is transferred to a grinder 68 and subsequently to recycle bin 54; the finished product (B) is transported to storage; and the fines (C) are returned directly to recycle bin 54.

In the event that the amount of material generated by A and C for the recycle stream is insufficient, the deficit may be made up by diverting a portion of finished product B to grinder 68 along with product A.

In the practice of the invention, the physical and chemical make up of the recycle stream may have a direct impact on the physical and chemical nature of the final coated product. For the most part, market demand for coated products of this nature is for a spherical shaped 6 mesh size or an SGN of about 220. In some instances, the recycle material and substrate material contained in recycle bin 54 may require more than one coating, and in some instances at least 3 to 4 coatings, before the desired coating thickness is achieved. In the present example, the SGN or Size Guide Number of recycle material being fed from recycle bin 54 is preferably about 90. A determination of the correct coating thickness is made by determining the difference in the SGN of the input material and the output material.

It is also preferred that the chemical composition of the recycle material be relatively closely regulated. At start-up, the composition of material in the recycle bin should be substantially identical to the desired analysis.

For example, if the desired end product is a substrate of ammonium sulfate with an equal parts by weight coating of methylene urea, then the recycle bin preferably would include about 50 percent ammonium sulfate and about 50 percent of a commercially available methylene urea product by weight. Once the process is initiated, there is no need for additional methylene urea product, because the coating process is sufficient to maintain the desired formulation. At this point the recycle bin preferably includes the substrate to be coated (for example, ammonium sulfate), fines material generated in the process, and ground-up oversize material.

Particles

The composition and method of the invention facilitate the formation of a coated substrate. Preferably, the coated substrate includes at least one layer of the foregoing coating composition. The coating is preferably an inert polymeric material including relatively low molecular weight methylene ureas. Preferred methylene ureas include methylenediurea, dimethylenetriurea, trimethylene tetraurea, and combinations thereof In one embodiment, the coating composition includes a substantial amount of methylenediurea. In another embodiment, the coating composition includes a substantial amount of methylenetriurea.

The coating preferably has a total nitrogen (N) content ranging from about 39 N to about 42 N. In the present embodiment, the water soluble polymeric nitrogen content of the coating is preferably at least about 50 percent (20–21 percent N). The urea nitrogen content is preferably less than about 15 percent (6.9 percent N).

Suitable substrates to which the coatings may be applied include, but are not limited to, inert substances such as vermiculite and ground corn cobs, fertilizer ingredients such as ammonium sulfate, ammonium phosphate (mono and dibasic), potassium sulfate, potassium chloride, micronutrients, herbicides, fungicides, and insecticides, and combinations thereof. Fertilizer ingredients are the preferred substrate. Other secondary or micronutrients may be used as a substrate or as part of a formulated substrate. The substrate may have any shape or size, which will vary according to the particular application. Of course, the substrate is generally smaller than the desired fmal particle. For example, a round substrate will have a smaller diameter than the diameter of the fmal particle.

Thus, another aspect of the invention is the provision of a particle having a slow release coating containing relatively low molecular weight, water soluble methylene urea compounds. Thus, the coating completely breaks down biologically over a period of time, and that has particular utility for coating fertilizer particles.

Method of Forming Low Molecular Weight Methylene Ureas

The composition and method also facilitate the production of a particle of relatively low molecular weight methylene urea compounds. The total nitrogen content of the particle of methylene urea product is the same as that of the previously described coating, which is preferably in the range of about 39 N to about 42 N. The water soluble polymeric nitrogen content of the solid methylene urea product is also preferably the same as that of the coating, which is preferably at least about 50 percent (20–21 percent N). The urea nitrogen content is preferably less than about 15 percent (6.9 percent N).

Thus, another aspect of the invention is the provision of a particle of relatively low molecular weight, water soluble methylene urea compounds. Thus, the particle completely breaks down biologically over a period of time, and that has particular utility as a fertilizer particles.

The present invention will be further illustrated by the following examples, which are intended to be illustrative in nature and are not to be considered as limiting the scope of the invention.

WORKING EXAMPLES

EXAMPLE 1

Production of Coated Ammonium Sulfate (CAS) 30-0-0 SGN 220.

A recycle material was heated to a temperature of about 80° C. Concurrently with heating the recycle material, the formaldehyde, urea, and sufficient potassium hydroxide to maintain a pH of 8.0, were continuously added to the jacketed reaction vessel to form a methylol urea solution. The residency time of the mixture in the reaction vessel was about 30 minutes. The temperature of the reaction vessel was maintained at about 65° C. The resulting methylol urea prepolymer solution was continuously metered to the ejector at a flow rate of about 4093+/−5 pounds. At this flow rate, the input and output of the reactor was equal.

TABLE 1

| Fertilizer Composition | Material | Quantity (pounds per hour) |
| --- | --- | --- |
| Methylol Urea Prepolymer Formula | Formaldehyde (50%) | 1368 |
| | Urea | 2725 |
| | Ammonium Sulfate | 3000 |

TABLE 1-continued

| Fertilizer Composition | Material | Quantity (pounds per hour) |
| --- | --- | --- |
| Recycle Formula | Ammonium Sulfate SGN 90 | 3000 |
| | Methylene Urea SGN 90 | 3000 |

On the suction side of the ejector, sufficient dilute sulfuric acid (15 percent by weight) was introduced to the mixing chamber of the ejector to reduce the pH of the resulting methylol urea prepolymer solution to about 3.5. The acidulated material was sprayed onto the incoming stream of recycle material in the first pug mill. Ammonium sulfate at rate of about 3000 lbs./hr and sufficient fines from the system were continuously added to the first pug mill from the recycle bin. The SGN of both the ammonium sulfate and methylene urea added to the recycle bin was 90.

Finished product at a rate of about 6000 lbs./hr. was returned to the system via the grinder and subsequently added to the recycle stream. Approximately three (3) tons per hour of finished particles (tph) were produced. The finished product was analyzed using a standard A.O.A.C. Keildjahl procedures for total nitrogen and high pressure liquid chromatography (HPLC) for ammoniacal nitrogen, urea nitrogen, methylene diurea nitrogen, and dimethylene triurea. Trimethylene urea, HWIN, and polymethylene were determined by A.O.A.C. method for determining AI or Activity Index.

| ANALYSIS | |
| --- | --- |
| Total N | 30.5% |
| Ammonia N | 10.0% |
| Urea N | 3.0 |
| Methylene diurea | 10.0 |
| Dimethylene Triurea | 1.5 |
| Trimethylene Tetraurea | 3.85 |
| Polymethylene urea | 1.65 |
| SGN | 215 |

The results of the analysis show that the present compositions and method are effective for coating ammonium sulfate particles with a relatively low molecular weight methylene urea coating.

EXAMPLE 2

Production of CAS 30-0-0 SGN 215.

The same process used in Example 1 was used, using the materials and formulas listed below in Table 2.

TABLE 2

| Fertilizer Composition | Material | Quantity (pounds per hour) |
| --- | --- | --- |
| Methylol Urea Prepolymer Formula | Urea Formaldehyde 85% | 1140 |
| | Urea | 2440 |
| | Water | 513 |
| | Ammonium Sulfate | 3000 |
| Recycle Formula | Ammonium Sulfate SGN 90 | 3000 |
| | Methylene Urea SGN 90 | 3000 |

Approximately three (3) tons per hour of finished particles (tph) were produced. The finished product was analyzed using a standard A.O.A.C. Keildjahl procedures for total nitrogen and high pressure liquid chromatography (HPLC)

for ammoniacal nitrogen, urea nitrogen, methylene diurea nitrogen, and dimethylene triurea Trimethylene urea, HWIN, and polymethylene were determined by A.O.A.C. method for determining AI or Activity Index.

| ANALYSIS | |
| --- | --- |
| Total N | 30.0% |
| Ammonia N | 10.1% |
| Urea N | 3.5 |
| Methylene diurea | 9.8 |
| Dimethylene Triurea | 1.7 |
| Trimethylene Tetraurea | 4.0 |
| Polymethylene urea | 0.9 |
| SGN | 215 |

The results of the analysis again show that the present compositions and method are effective for coating ammonium sulfate particles with a relatively low molecular weight methylene urea coating.

EXAMPLE 3

Production of 26-12-12 SGN 220.

The purpose of this example was to show the usefulness of the present compositions and methods for coating multi-component fertilizers.

Referring to FIG. 2, a pre-blend of material containing about 50 percent potassium sulfate (50 percent $K_2O$) and 50 percent mono-anmonium phosphate (12 percent N, 52 percent $P_2O_5$) was continuously fed at a rate of about 3000 lbs./hr. through a grinder which reduced the SGN of the blend to about 90, and subsequently to a recycle bin along with about 3000 lbs. of METH EX GG® (trademark of Lebanon Seaboard Corp. for methylene urea having an SGN of 90). From this point forward the process was conducted in the same manner as outlined in Examples 1 and 2.

| ANALYSIS | |
| --- | --- |
| Total N | 26.0% |
| Ammonia N | 6.0% |
| Urea N | 3.5 |
| Methylene diurea | 9.0 |
| Dimethylene Triurea | 2.0 |
| Trimethylene Tetraurea | 3.9 |
| Polymethylene urea | 1.6 |
| SGN | 220 |
| $P_2O_5$ | 12.5 |
| $K_2O$ | 12.0 |

The results of the analysis show that the present compositions and method are effective for coating multi-component fertilizers (ammonium sulfate, potassium sulfate, and mono-ammonium phosphate particles) with a relatively low molecular weight methylene urea coating.

EXAMPLE 4

There are some instances, especially on turf grass, where an SGN of 100 would be preferable to an SGN of 220. The present example shows the adaptability of the invention for producing such fertilizers, which are particularly useful on golf course greens and tees. The key to producing a product of this nature is control of the particle size of the start up recycle material and subsequent recycle streams. The particles in these streams must be maintained at an SGN of about 40. In order to demonstrate this, the following formula was established:

As shown below in Table 3, in the present example, the recycle was composed of 50 percent sulfate of potash and 50 percent METH EX GG®. Before initiating the process, the recycle was passed through a grinder where the particle size was reduced from an SGN of 90 to an SGN of 40. Thereafter, the process proceeded as outlined in Examples 1 and 2.

TABLE 3

| Fertilizer Composition | Material | Quantity (pounds per hour) |
| --- | --- | --- |
| Methylol Urea Prepolymer Formula | Urea Formaldehyde 85% | 1140 |
| | Urea | 2440 |
| | Water | 513 |
| | Sulfate of Potash (0-0-50) | 3000 |
| Recycle Formula | Sulfate of Potash (0-0-50) | 3000 |
| | METH EX GG (SGN 40) | 3000 |

| ANALYSIS | |
| --- | --- |
| Total N | 20.0% |
| Urea N | 3.0 |
| Methylene diurea | 10.0 |
| Dimethylene Triurea | 1.0 |
| Trimethylene Tetraurea | 4.0 |
| Polymethylene urea | 2.0 |
| SGN | |
| $P_2O_5$ | 0 |
| $K_2O$ | 25.0 |

The results of the analysis show that the present compositions and method are effective for providing varying SGN values of coated multi-component fertilizers.

EXAMPLE 5

Evaluation of Methylene Urea as a Coating.

Until the early 1980's the terms "controlled" or "slow release" were closely associated with solubility characteristics of a product as determined by the A.O.A.C. (Association of Official Agricultural Chemist) test method 2.071 (WIN).

With the advent of products generically referred to as "low molecular weight methylene urea fertilizers" this concept had to be re-evaluated. Methylene ureas have excellent controlled release properties, even though they were considered water-soluble according to A.O.A.C. 2.071. In order to alleviate this problem, another test method for methylene ureas was devised (A.O.A.C. 983.01).

Because grinding the particles destroys any coating on the particles, the standard procedure of A.O.A.C. 983.01 does not consider the effectiveness of methylene urea as a coating agent, which can control the release of the substrate being coated.

A. Dilution 250 ml, ground sample

An ammonium sulfate substrate coated with an equal weight of low molecular weight methylene urea (principally methylene diurea) was evaluated using A.O.A.C. 983.01. The material had an SGN of 235 and uniformity index of 90. In accordance with the test method, the CAS material was ground to pass a 40-mesh sieve. The ground material was then leached with 250 ml of water and the supernatant was subjected to high-pressure liquid chromatography for evaluation.

| ANALYSIS | |
| --- | --- |
| Total N | 30.0% |
| Ammonia N | 10.5% |
| Urea N | 3.0 |
| Methylene diurea | 10.5 |
| Dimethylene Triurea | 1.0 |
| Water soluble N | 5.0 |
| SGN | 235 |
| Uniformity Index | 90 |

Figure 3:
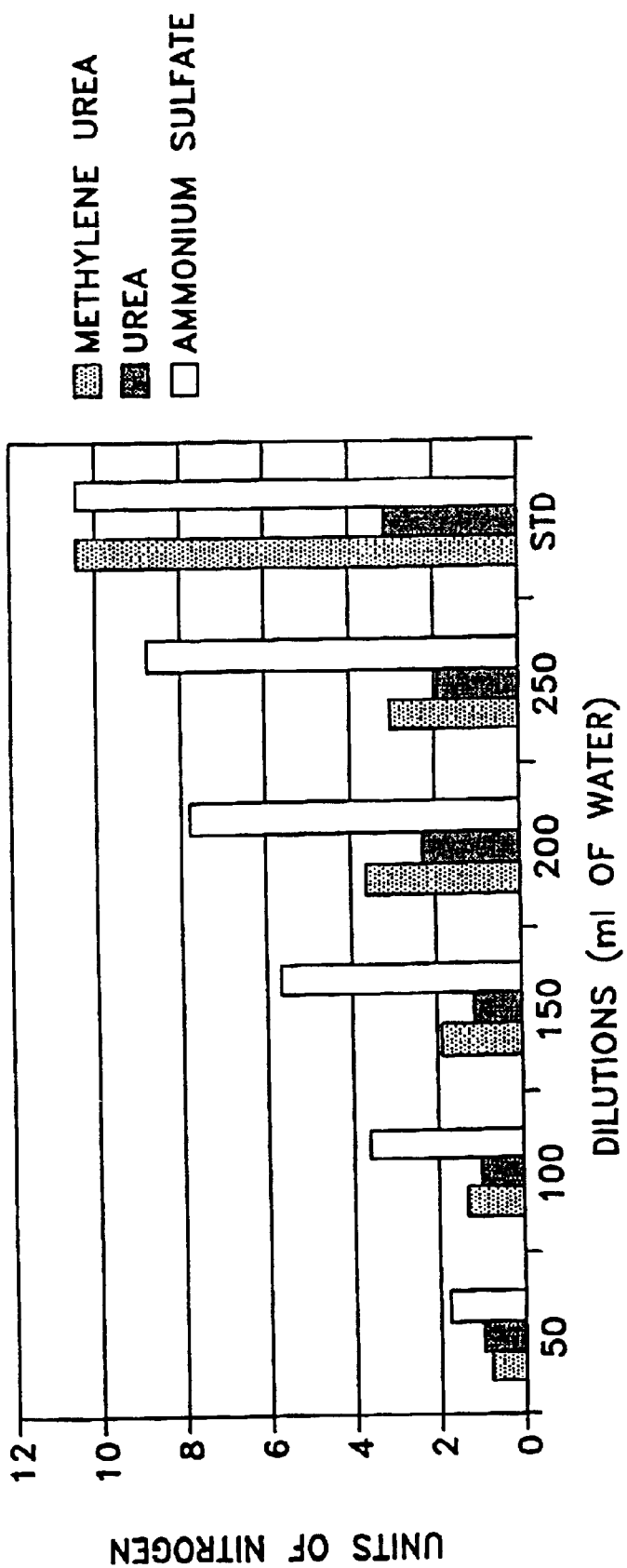
FIG. 3 is a comparison of the solubility of methylene urea, urea, and ammonium sulfate at various dilutions.

As shown in the table below and in FIG. 3, the total amount of soluble nitrogen contained in sample A was 24% when analyzed by the standard A.O.A.C. 983.01.

TABLE 4

| Sample | A Ground | B | C | D Unground | E | F |
| --- | --- | --- | --- | --- | --- | --- |
| Dilution (ml) | 250 | 250 | 200 | 150 | 100 | 50 |
| Methyleneurea N | 10.5 | 3.045 | 3.36 | 1.96875 | 1.24215 | 0.7476 |
| Urea N | 3 | 1.89 | 2.4 | 1.11 | 0.9504 | 0.9108 |
| Ammonium N | 10.5 | 8.715 | 7.8225 | 5.565 | 3.55005 | 1.701 |
| Total soluble nitrogen | 24 | 13.65 | 12.58 | 8.64 | 5.74 | 3.36 |

Non-Standard Tests

The same CAS material was evaluated without grinding the particles in order to keep the methylene urea coating intact. One (1) gram samples of the CAS were leached with predetermined volumes of water at room temperature (about 68° F.). The supernatant from the sample was then analyzed in accordance with A.O.A.C. 983.01.
B. Standard Dilution: 250 ml.

The result of the analysis show that when the coating was left intact, only 64 percent (13.65 N) was leached: 83 percent (8.715 N) was leached in the form of ammonia sulfate N, 63 percent (1.9 N) in the form of urea N, and 29 percent in the form of methylene urea.
C. Dilution: 200 ml.

The result of the analysis show that when the leachate 54% (13.58 N) of the total N available; 74.5% (7.82 N) ammoniacal N; 80.0% (2.4 N) urea N; 32% (9.36 N) methylene urea was leached.
D. Dilution: 150 ml.

Of the total water soluble nitrogen available 33.6% (8.63 N) was leached; 53% of the ammonical; 37% (1.12 N) of the urea; and 18.75% (1.95 N) of the nitrogen available from these segments.
E. Dilution: 100 ml.

Of the total soluble nitrogen available 22.34% (5.74 N) was leached; 33.81% (3.55 N) of the ammoniacal, 36.68% (0.96 N) of the urea and 11.83% (1.23 N) of the methylene urea was leached.
F. Dilution: 50 ml.

Of the total water soluble nitrogen available 13.1% (.74 N) was leached; 16.2% (1.7 N) of the ammoniacal; 30.³6% (0.92 N) of the urea and 7.12% (0.74 N) of methylene urea was leached.

In a ground sample, all of the ammonium sulfate is leached regardless of the dilution. Thus, the present example shows that the coated ammonium sulfate effectively slows or controls the release of the ammonium sulfate.

EXAMPLE 6

The growth rate, visual quality, and nitrogen uptake of grass fertilized with the present compositions was compared to that of grass fertilized with various commercially available commonly used slow release fertilizer products. The commercially available slow release products included the following:

NITROFORM® (trademark of Nor Am Chemical identifying ureaform);
NUTRALENE® (trademark of Nor Am Chemical identifying methylene urea);
IBDU® (Trademark of Vigaro Industries); and
SCU (sulfur coated urea available from CIL);
Test plots of Bermudagrass, Tifway Bermudagrass and Tifgreen Bermudagrass were defined, each having an area of 6×9 feet. Each plot was irrigated on a daily basis according to good turfgrass management practices.

Phosphorus and potassium fertilization were maintained according to good turfgrass management practices.

Each of the foregoing fertilizers were applied to individual plots of each type of grass in established stands of each type of grass, every 90 days. Each fertilizer was evaluated at two rates: about 1.5 pounds N/100 square feet, and about 3.0 pounds N/100 square feet based on two rates. Three replications of treatments were arranged in a randomized complete block design.

The Bermudagrass and Tifway Bermudagrass were maintained at a one (1) inch cutting height. Clippings were accumulated from each cutting, and tested every 45 days. N uptake estimates were taken every 45 days. Visual ratings were taken biweekly.

The Tifgreen Bermudagrass was maintained at putting green height (³⁄₁₆ inch). Clippings were accumulated from each cutting, and tested every 45 days. N 12 uptake estimates were taken every 45 days. Visual ratings were taken biweekly.

Visual Quality

Figure 4:
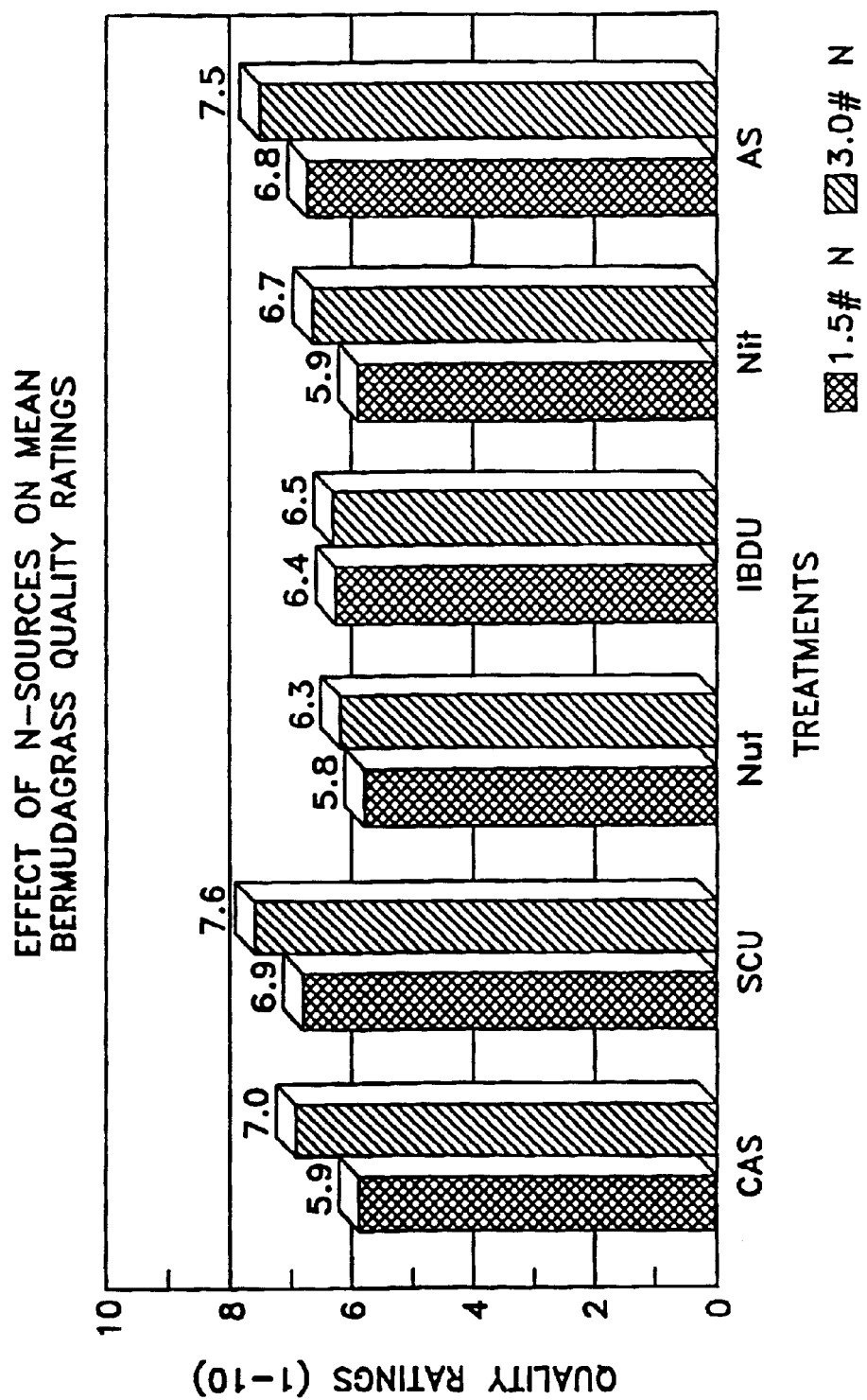
FIG. 4 is a graph showing the relative effects of different nitrogen sources on the mean quality rating of Bermudagrass.
Figure 5:
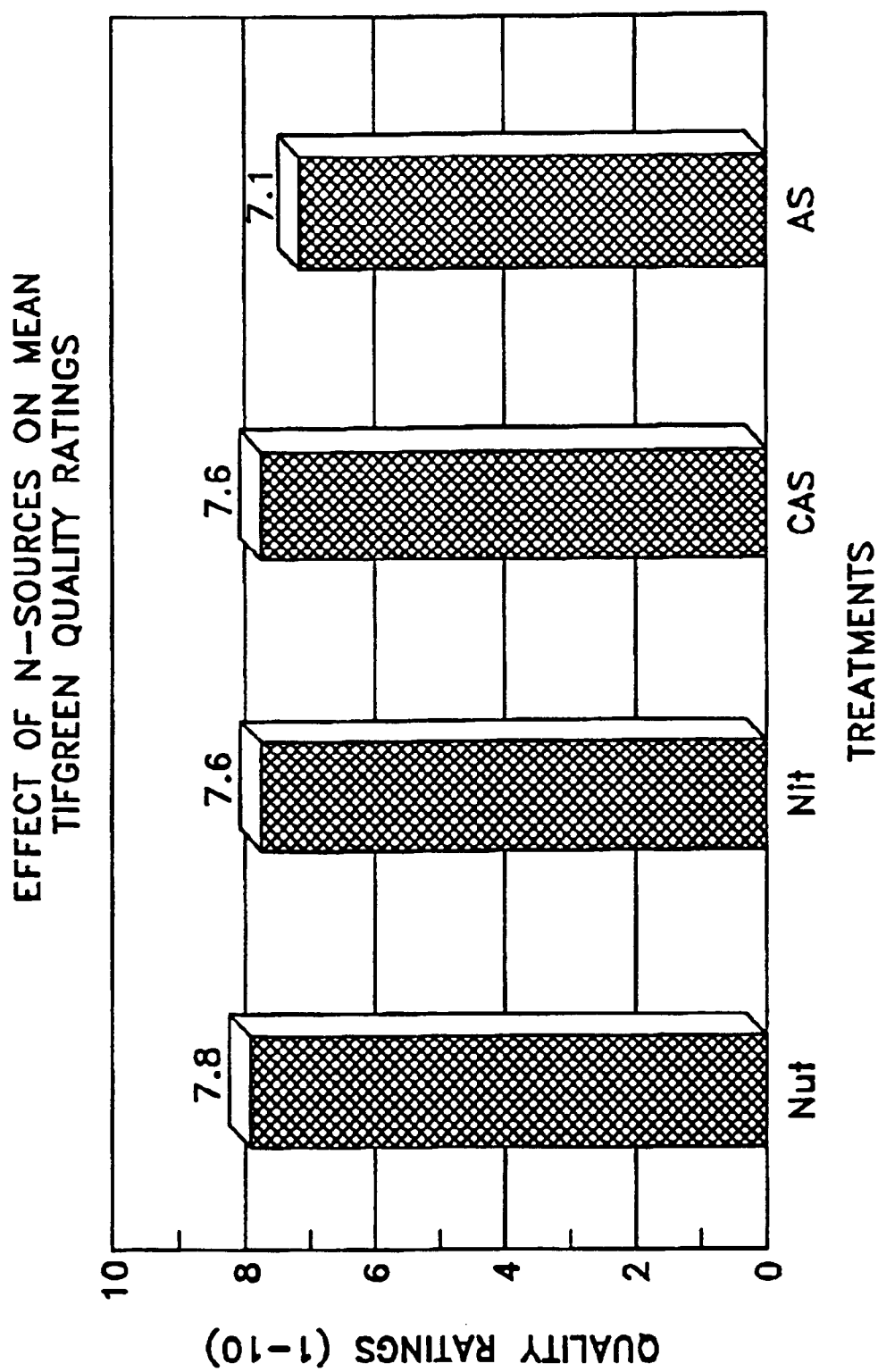
FIG. 5 is a graph showing the relative effects of different nitrogen sources on the mean quality rating of Tifgreen Bermudagrass.

Visual quality was measured on a scale of 1–10, with 10 being the best. As shown in FIGS. 4 and 5, very high visual quality was maintained by all materials on Bermudagrass and Tifgreen Bemudagrass throughout the study period. Mean visual quality ratings for the four N sources on Tifgreen Bernudagrass exceeded 7.0, which indicated a high quality turfgrass.

Growth Rate

Figure 6:
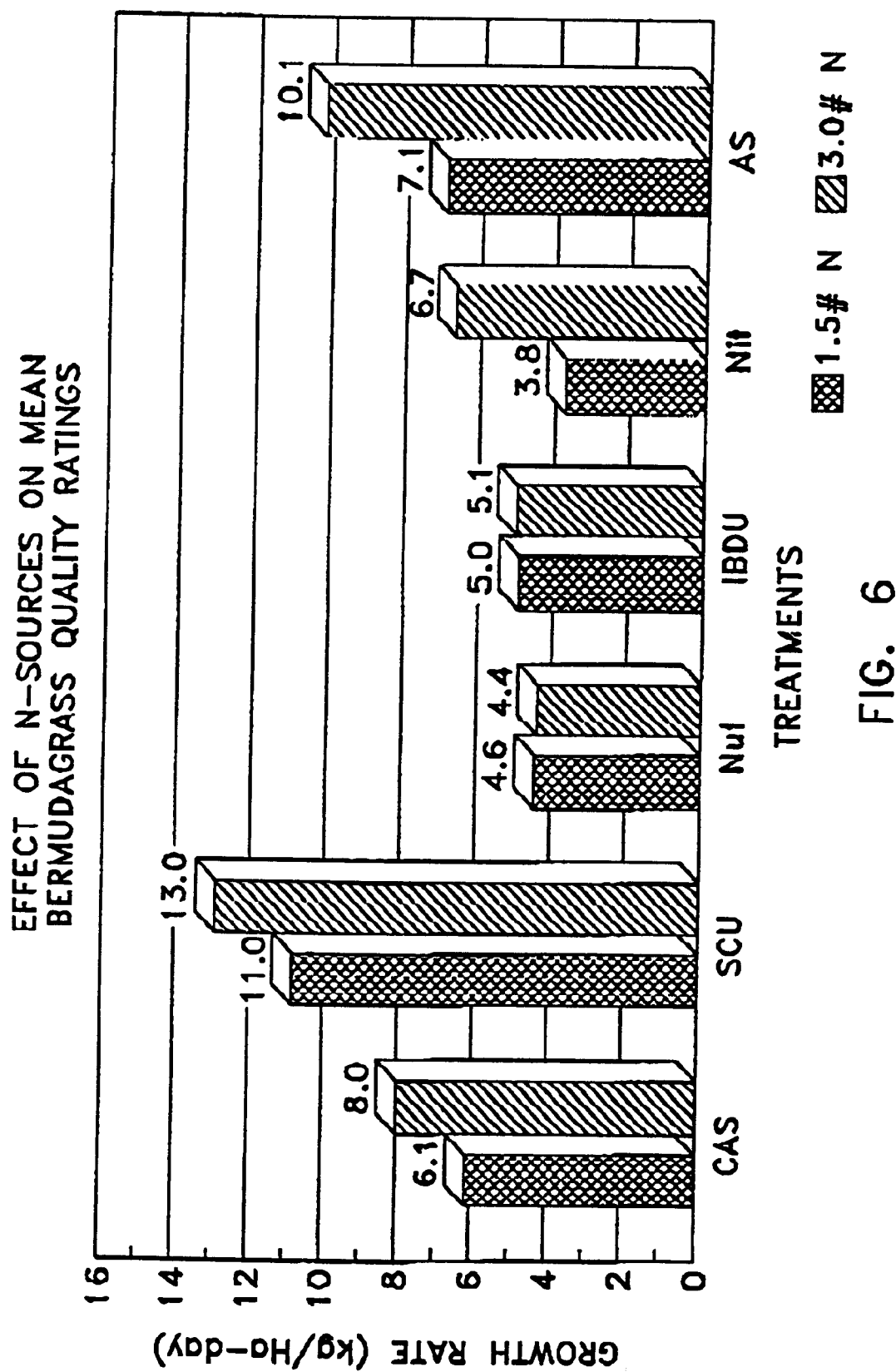
FIG. 6 is a graph showing the relative effects of different nitrogen sources on the mean growth rate of Bernudagrass.

The Tifway Bermudagrass growth rate response to the different N sources is presented in FIG. 6. On Tifway Bermudagrass, the N sources of NUTRALENE, NITROFORM and IBDU produced a relatively slow growing turfgrass. In general, the SCU and CAS produced the fastest mean growth rate, while NUTRALENE and IBDU produced the slowest mean growth rate.

Figure 7:
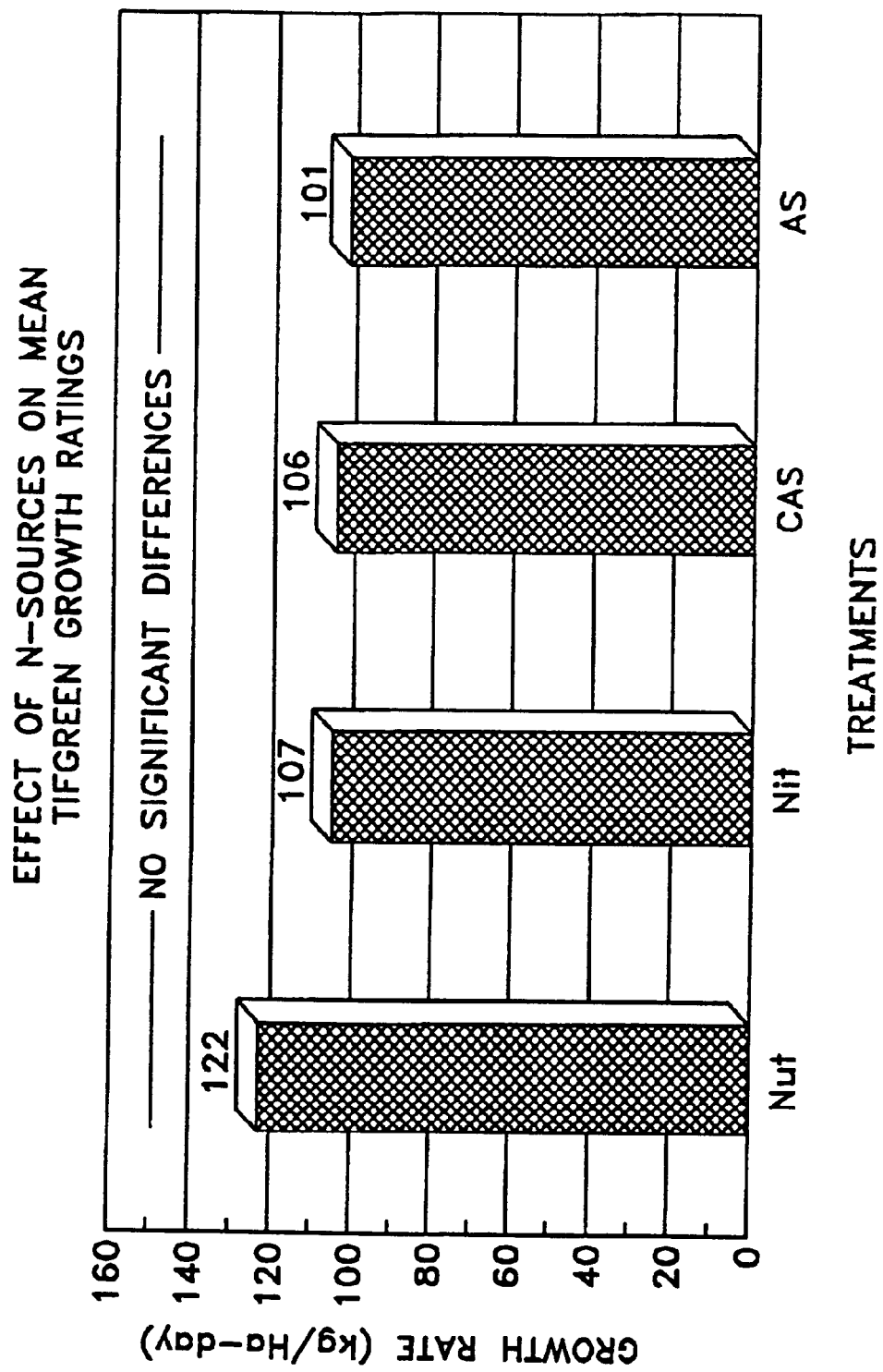
FIG. 7 is a graph showing the relative effects of different nitrogen sources on the mean growth rate of Tifgreen Bermudagrass.

As shown in FIG. 7, when applied to the Tifgreen Bermudagrass maintained at putting green height the N source materials did not differ statistically in growth rate response. NUTRALENE did produce the highest overall magnitude in growth rate, but its growth rate was not statistically different from the other sources.

Ideally, the product that produces the most rapidly growing turfgrass is not always the most desirable material. Therefore, a fertilizer that produces a turfgrass with a high visual quality that does not require excessive mowing and maintenance is desirable.

Therefore, the CAS produced an intermediate growth rate while maintaining an acceptable visual quality, both comparable to other commercially available

Nitrogen Uptake

The same materials used in the previous example was evaluated for their effectiveness in supplying N to the plant and resisting loss due to leaching using a specially designed natural environment leaching study. Specially designed containers were placed in the ground and used as leachate collection reservoirs. The fertilizers were applied to the surface of soil in these containers using the same deposition rates, but every thirty (30) days rather than every 90 days. The containers were exposed to programmed irrigation and natural rainfall.

Periodically, as the containers reached capacity, the total volume of leachate was collected and analyzed for ammonium nitrogen and nitrate nitrogen. By collecting the total volume of water that moved through the soil profile, it was possible to estimate the rate of leaching loss one would have from the material when applied to a turfgrass growing in the natural environment under the worst case scenario.

Figure 8:
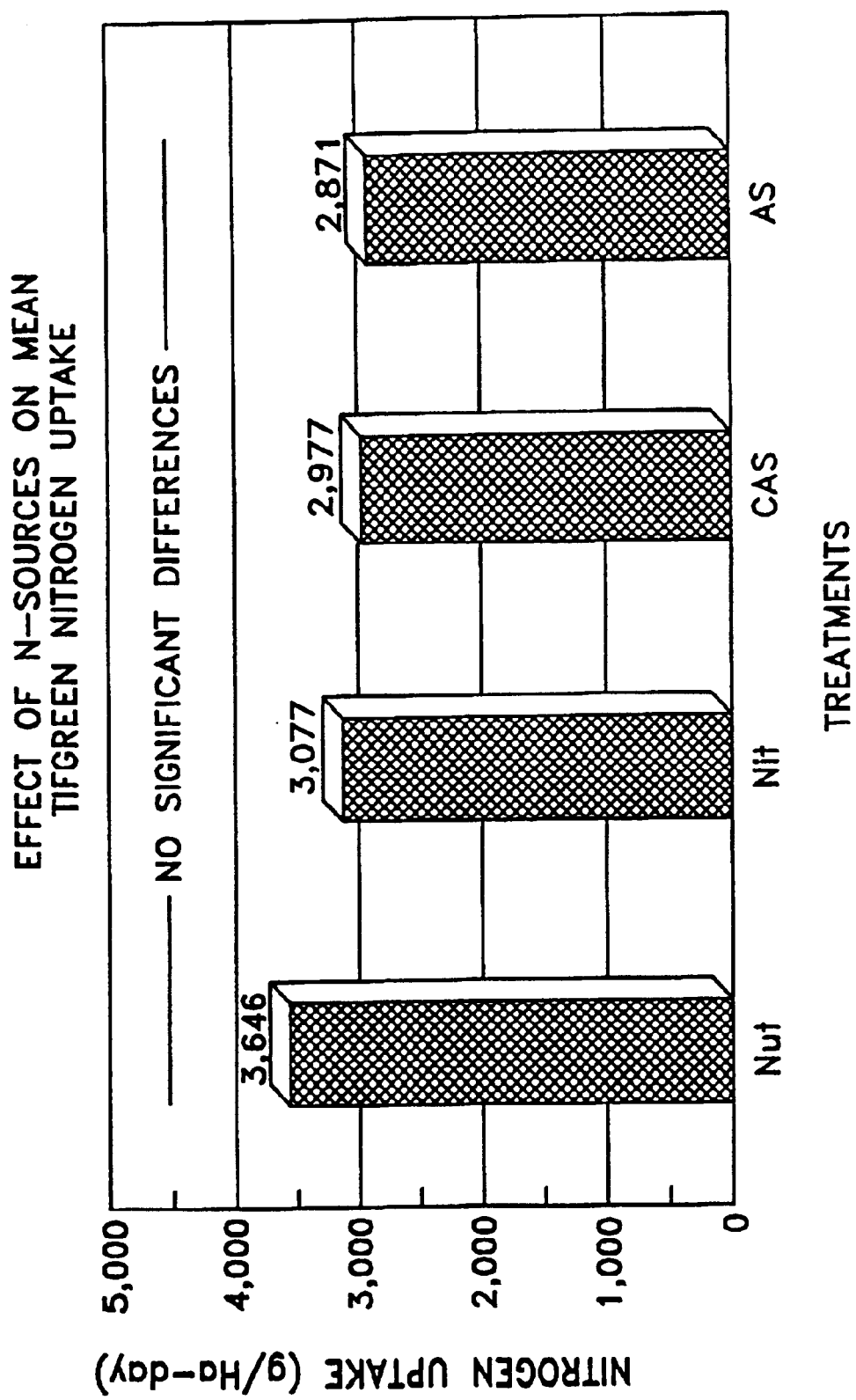
FIG. 8 is a graph showing the relative effects of different nitrogen sources on the mean nitrogen uptake of Tifgreen Bermudagrass.

As shown in FIG. 8, no large differences in N uptake were noted in Tifgreen Bermudagrass maintained at putting green height relative to N source applied. Statistically, there were no differences in the response but on an absolute magnitude scale NUTRALENE produced the most rapidly growing turfgrass.

Figure 9:
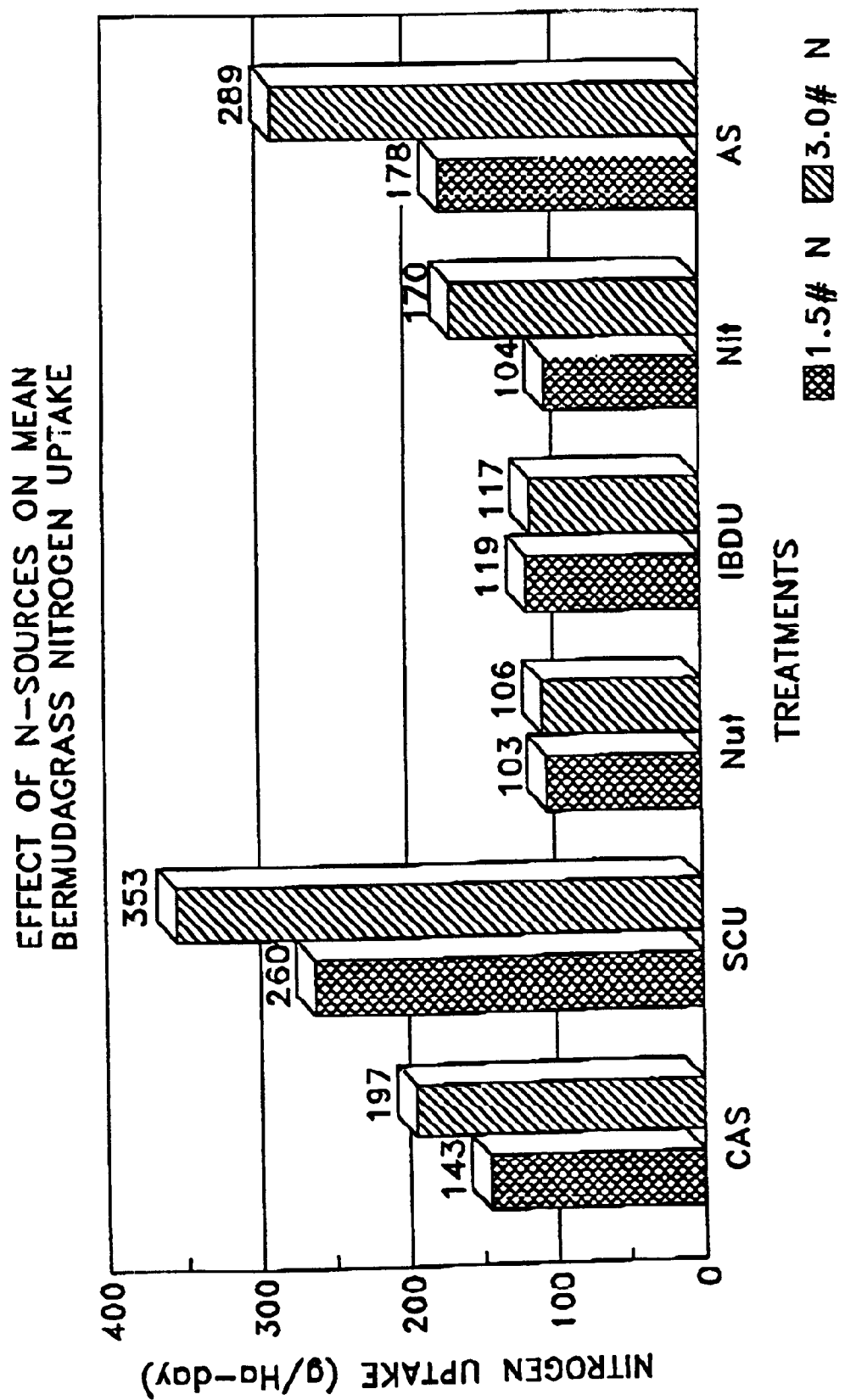
FIG. 9 is a graph showing the relative effects of different nitrogen sources on the mean nitrogen uptake of Bermudagrass.

As shown in FIG. 9, a similar response was obtained in the N uptake on Bermudagrass. The CAS supplied more total N to the Tifgreen Bermudagrass but it did not differ statistically from the other N sources in N supply.

Overall

It appears that the CAS provided comparable visual quality growth rate and nitrogen uptake in comparison to the NITROFORM and NUTRALENE. Because the N uptake rate very closely followed the growth rate response, it appears that the differences in growth rate were related to N uptake (FIGS. 8 and 9). The results show that CAS can produce a high quality turfgrass while producing a somewhat slower growing turfgrass.

EXAMPLE 8

Figure 10:
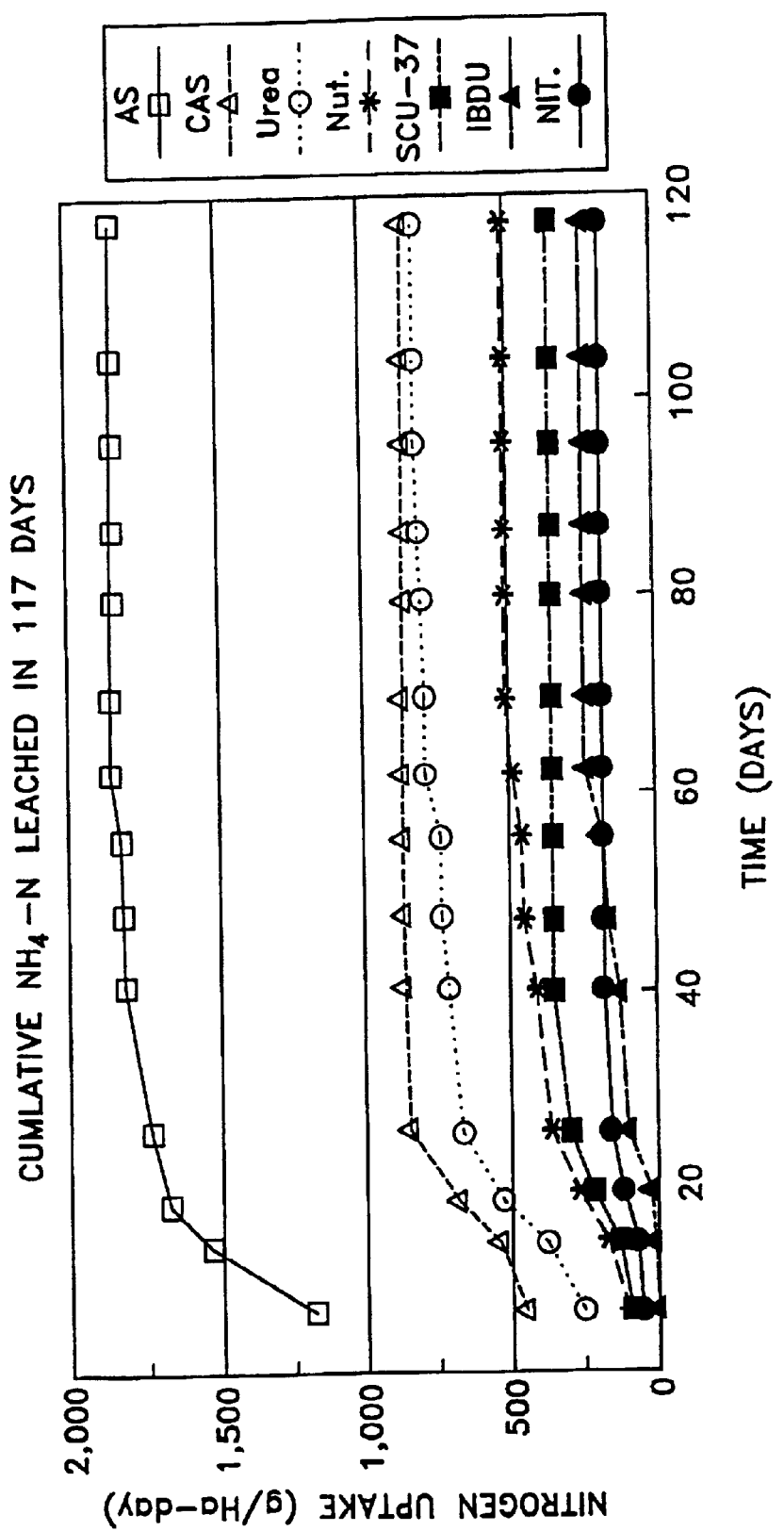
FIG. 10 is a graph showing a comparison of the cumulative ammonium nitrogen leached from different nitrogen sources during a 117 day time period.

N Leaching Study: Cumulative ammonium-N leached in 117 days is presented in FIG. 10. The uncoated ammonium sulfate leached far more $NH_4$—N than did the other N sources. Coating the Ammonium sulfate reduce the N loss by almost two fold. The NUTRALENE, SCU-37, IBDU and NITROFORM leached about ¼ as much $NH_4$—N as did the ammonium sulfate.

Figure 11:
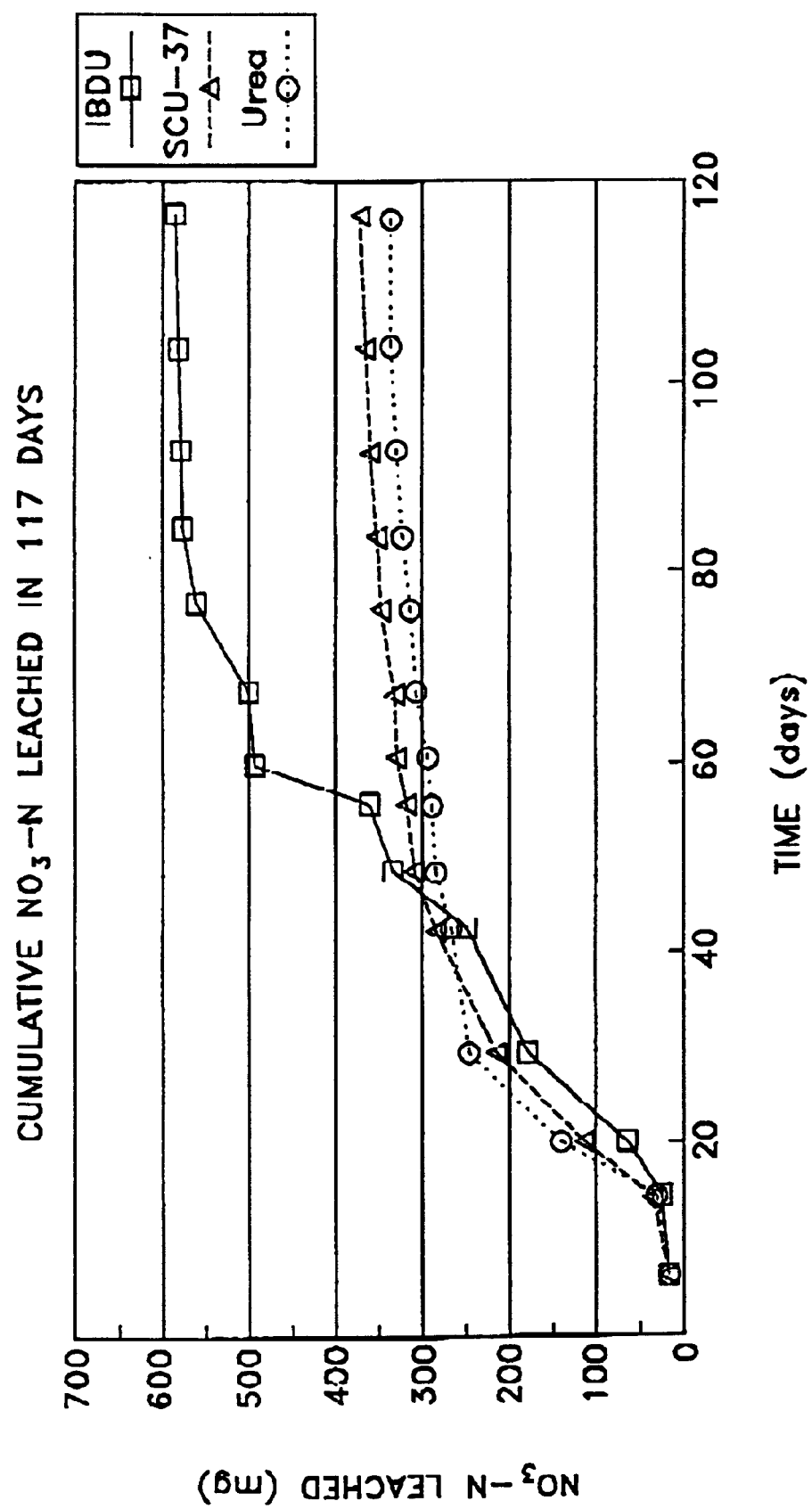
FIGS. 11 and 12 are graphs showing a comparison of the cumulative nitrate nitrogen leached from different nitrogen sources during a 117 day time period.

Cumulative $NO_3$—N leached from IBDU, SCU and Urea is presented in FIG. 11. As seen before the IBDU leached the largest quantity of $NO_3$—N compared to the other N source materials. This is probably due to the high nitrification rate in the high pH zone immediately around the IBDU granule.

Figure 12:
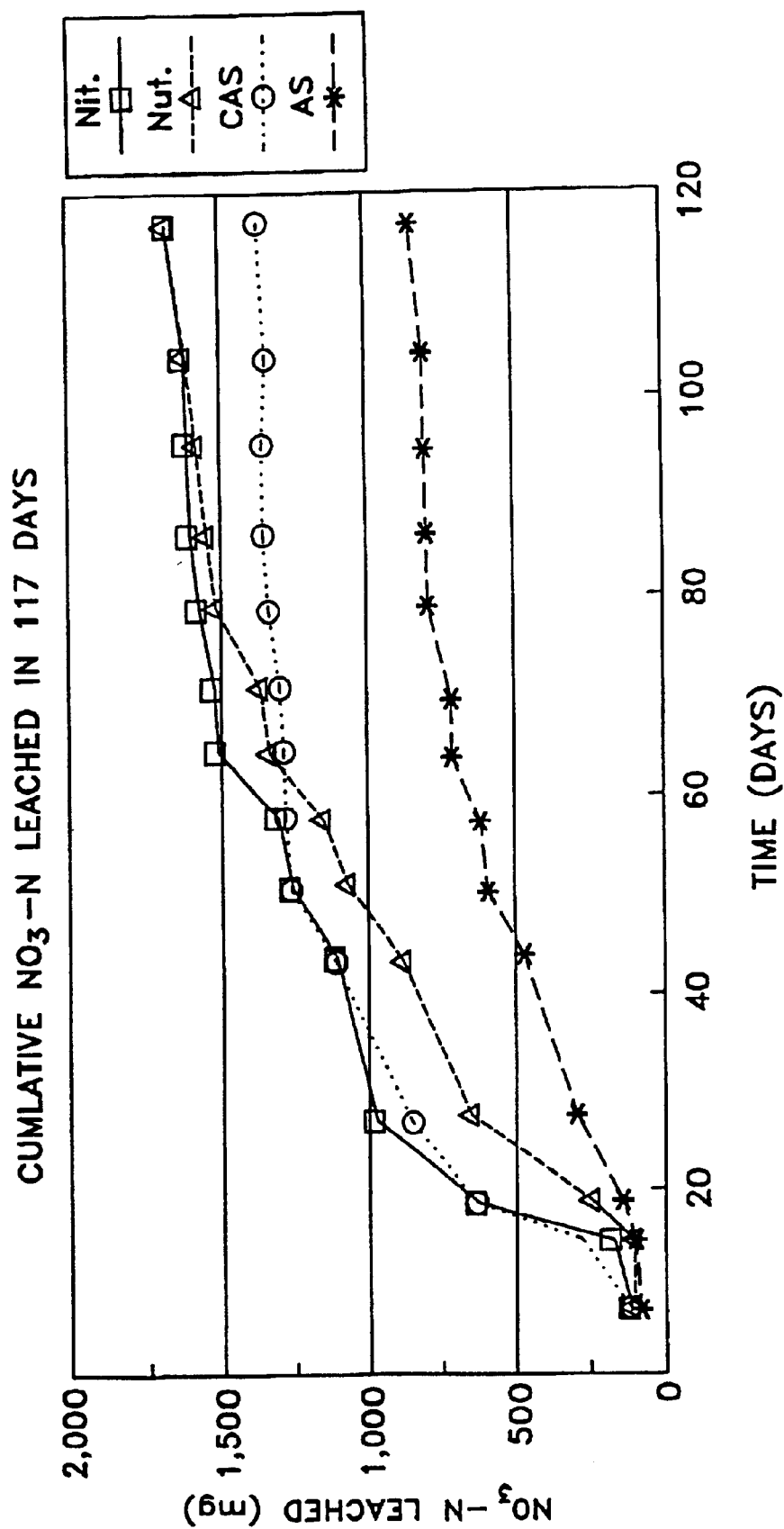

Cumulative $NO_3$—N leached from the other slow-release N sources is presented in FIG. 12. Notice that the scale of the figure has changed to approximately half that of FIG. 11. NITROFORM and NUTRALENE leached almost identical amounts of $NO_3$—N over the 117 day period. Ammonium sulfate leached the least amount of $NO_3$—N.

Figure 13:
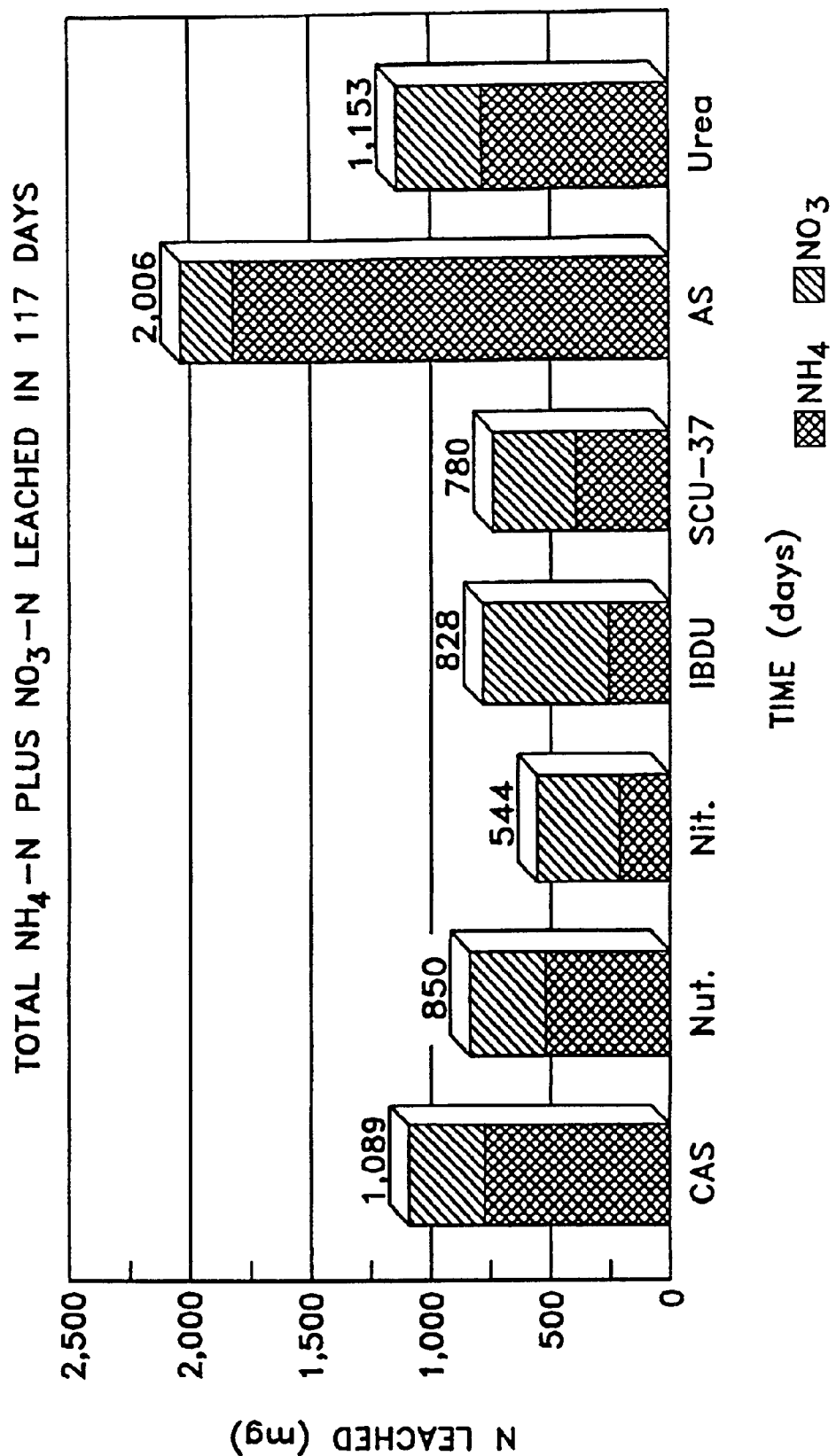
FIG. 13 is a graph showing a comparison of the cumulative ammonium nitrogen and nitrate nitrogen leached from different nitrogen sources during a 117 day time period.

Total cumulative quantities of $NH_4$—N and $NO_3$—N leached by each N source over the 117 day period are presented in FIG. 13. It is clear that the uncoated ammonium sulfate leached far more total N than did the other N sources, primarily due to the large quantity of $NH_4$—N leached. Coating the ammonium sulfate reduced the total N leached by approximately 50%. NUTRALENE, IBDU and SCU leached approximately the same quantity of total N, whereas NITROFORM leached the smallest quantity of N relative to the other N sources. In N sensitive areas nitroform would be the preferred material.

Uncoated ammonium sulfate leached by far the most total N while NITROFORM leached the least. The NITROFORM leached approximately ¼ the total N as did the Ammonium sulfate.

Coating the ammonium sulfate reduced the total N leached by 50% relative to uncoated ammonium sulfate.

Although particular embodiments of the invention have been described in detail for purposes of illustration, various changes and modifications may be made without departing from the scope and spirit of the invention. All combinations and permutations of the compounds and operational methods are available for practice in various applications as the need arises. For example, the apparatus and method of the invention may be applied to processes that are presently not practically feasible. Accordingly, the invention is not to be limited except as by the appended claims.

What is claimed is:

1. A method of forming a methylol urea prepolymer, comprising the steps of:

providing a source of methylol urea and a source of aldehyde and reacting the urea and the aldehyde in the presence of an excess of urea to form the methylol urea prepolymer.

2. The method of claim 1, wherein the urea and aldehyde are provided in a molar ratio of at least about 1.5 mole of urea to about 1 mole of formaldehyde.

3. The method of claim 2, further comprising the step of reacting the urea and the aldehyde in a pH range of about 7.0 to about 10.0.

4. The method of claim 3, further comprising the step of reacting the urea and the aldehyde at a temperature of at least about 40° C.

5. The method of claim 4, further comprising the step of acidifying the methylene urea prepolymer in a pH range of about 3.0 to about 4.0 to form a methylene urea reaction product.

6. The method of claim 5, wherein the methylene urea reaction product comprises relatively low molecular weight methylene urea compounds.

7. The method of claim 6, wherein the relatively low molecular weight methylene urea compounds are selected from the group consisting of methylenediurea, dimethylenetriurea, and combinations thereof.

8. The method of claim 7, wherein the relatively low molecular weight methylene urea compounds further include trimethylene triurea.

9. The method of claim 1, wherein the source of aldehyde comprises at least about 30 percent formaldehyde, by weight.

10. A method of forming a methylene urea having a total nitrogen content ranging from about 40 N to about 42 N, comprising the steps of:

providing a source of methylol urea and a source of aldehyde and reacting the urea and the aldehyde in the presence of an excess of urea to form the methylol urea prepolymer; and acidifying the methylene urea prepolymer in a pH range of about 3.0 to about 4.0 to form a methylene urea reaction product.

* * * * *